(12) United States Patent
Beyerer et al.

(10) Patent No.: US 10,942,526 B2
(45) Date of Patent: Mar. 9, 2021

(54) SYSTEM FOR NAVIGATION OF AN AUTONOMOUSLY NAVIGATING SUBMERSIBLE BODY DURING ENTRY INTO A DOCKING STATION, METHOD

(71) Applicant: Fraunhofer-Gesellschaft zur Foerderung der angewandten Forschung e.V., Munich (DE)

(72) Inventors: Juergen Beyerer, Diehlheim (DE); Gunnar Brink, Karlsruhe (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 163 days.

(21) Appl. No.: 16/147,212

(22) Filed: Sep. 28, 2018

(65) Prior Publication Data
US 2019/0033887 A1    Jan. 31, 2019

Related U.S. Application Data

(63) Continuation of application No. PCT/EP2017/057599, filed on Mar. 30, 2017.

(30) Foreign Application Priority Data

Mar. 31, 2016    (EP) .................... 16163313

(51) Int. Cl.
*G05D 1/06* (2006.01)
*B63G 8/00* (2006.01)
(Continued)

(52) U.S. Cl.
CPC ............ *G05D 1/0692* (2013.01); *B63C 1/12* (2013.01); *B63G 8/001* (2013.01); *B63G 8/14* (2013.01);
(Continued)

(58) Field of Classification Search
CPC .................. G05D 1/0692; G06T 7/246; G06T 2207/30232; G06T 2207/30252;
(Continued)

(56) References Cited

U.S. PATENT DOCUMENTS

| 3,768,664 A | 10/1973 | Bauer et al. |
| 4,114,827 A | 9/1978 | Maier |

(Continued)

FOREIGN PATENT DOCUMENTS

| AU | 2011213906 B2 | 9/2013 |
| CN | 102381651 A | 3/2012 |

(Continued)

OTHER PUBLICATIONS

Chakrabarti, Romon, "Abhandlungen über den Nutzen, den Aufbau und den Betrieb autonomer Unterwasserfahrzeuge", Doctoral Thesis, Technische Universität Berlin, Fakultät V—Verkehrs- und Maschinensysteme, Exam Date: Jul. 17, 2015, Issue Date: Aug. 21, 2015, pp. 1-247 and English Abstract 4 pp.

(Continued)

*Primary Examiner* — Michael V Kerrigan
(74) *Attorney, Agent, or Firm* — Michael A. Glenn; Perkins Coie LLP

(57) ABSTRACT

A system for navigation of an autonomously navigating submersible body during entry into a docking station below the water surface includes a determiner for determining an actual motion vector of the autonomously navigation submersible body in relation to the set motion vector describing the optimum entry direction into the docking station and a calculating unit. The calculating unit serves to determine the deviation between the actual motion vector and the set motion vector to determine control vectors based on the deviation and to thereby control the autonomously navigating submersible body during entry.

19 Claims, 5 Drawing Sheets

(51) Int. Cl.
*B63G 8/14* (2006.01)
*G06T 7/246* (2017.01)
*B63C 1/12* (2006.01)
*G01S 15/58* (2006.01)
*B63B 27/16* (2006.01)
*H04N 5/225* (2006.01)

(52) U.S. Cl.
CPC ............ *G01S 15/58* (2013.01); *G06T 7/246*
(2017.01); *B63B 2027/165* (2013.01); *B63G 2008/002* (2013.01); *B63G 2008/004* (2013.01); *B63G 2008/005* (2013.01); *B63G 2008/008* (2013.01); *G06T 2207/30232* (2013.01); *G06T 2207/30252* (2013.01); *H04N 5/225* (2013.01)

(58) Field of Classification Search
CPC ..... B63C 1/12; G01S 15/58; B63B 2027/165; H04N 5/225; B63G 8/14; B63G 8/001; B63G 2008/008; B63G 2008/002; B63G 2008/004; B63G 2008/005
See application file for complete search history.

(56) References Cited

U.S. PATENT DOCUMENTS

| | | | |
|---|---|---|---|
| 4,281,615 | A | 8/1981 | Wilson et al. |
| 4,304,337 | A | 12/1981 | Dummer |
| 4,448,396 | A | 5/1984 | Delago |
| 4,547,857 | A | 10/1985 | Alexander |
| 4,843,460 | A | 6/1989 | Le Guet et al. |
| 4,932,541 | A | 6/1990 | Belsterling |
| 5,117,992 | A | 6/1992 | Simkus, Jr. et al. |
| 5,785,191 | A | 7/1998 | Feddema et al. |
| 5,970,906 | A | 10/1999 | Hrescak et al. |
| 5,975,803 | A | 11/1999 | Mackinnon |
| 6,216,789 | B1 | 4/2001 | Lorsignol et al. |
| 6,442,439 | B1 | 8/2002 | Robinett, III et al. |
| 6,496,765 | B1 | 12/2002 | Robinett, III et al. |
| 6,561,112 | B1 | 5/2003 | Benson et al. |
| 6,659,703 | B1 | 12/2003 | Kirkley |
| 6,826,452 | B1 | 11/2004 | Holland et al. |
| 7,296,530 | B1 | 11/2007 | Bernstein et al. |
| 7,367,464 | B1 | 5/2008 | Agostini et al. |
| 8,145,369 | B1* | 3/2012 | Tureaud .................. B63B 21/66 701/1 |
| 8,195,368 | B1 | 6/2012 | Leban et al. |
| 2002/0144967 | A1 | 10/2002 | Jacoff et al. |
| 2004/0073343 | A1 | 4/2004 | Nayfeh et al. |
| 2004/0164041 | A1 | 8/2004 | Sawodny et al. |
| 2004/0188094 | A1 | 9/2004 | Piecyk et al. |
| 2005/0103738 | A1 | 5/2005 | Recktenwald et al. |
| 2005/0229439 | A1 | 10/2005 | Nicholson et al. |
| 2005/0242332 | A1 | 11/2005 | Ueki et al. |
| 2007/0050115 | A1 | 3/2007 | Discenzo et al. |
| 2007/0203623 | A1 | 8/2007 | Saunders et al. |
| 2007/0219662 | A1 | 9/2007 | Sawodny et al. |
| 2007/0272906 | A1 | 11/2007 | Davidson |
| 2008/0202405 | A1 | 8/2008 | Kern |
| 2010/0018449 | A1 | 1/2010 | Luccioni et al. |
| 2010/0189541 | A1 | 7/2010 | Laenge |
| 2011/0076130 | A1 | 3/2011 | Stocker et al. |
| 2012/0192780 | A1 | 8/2012 | Soreau et al. |
| 2012/0215348 | A1 | 8/2012 | Skrinde |
| 2013/0213919 | A1 | 8/2013 | Kyllingstad |
| 2013/0245815 | A1 | 9/2013 | Schneider et al. |
| 2013/0245816 | A1 | 9/2013 | Langer et al. |
| 2013/0245817 | A1 | 9/2013 | Schneider et al. |
| 2016/0023722 | A1 | 1/2016 | Hesse |

FOREIGN PATENT DOCUMENTS

| | | |
|---|---|---|
| CN | 202400265 U | 8/2012 |
| CN | 103183113 A | 7/2013 |
| CN | 103963947 A | 8/2014 |
| CN | 104002942 A | 8/2014 |
| CN | 203833517 U | 9/2014 |
| DE | 19940396 A1 | 5/2000 |
| DE | 202004018166 U1 | 1/2005 |
| DE | 102013207731 A1 | 10/2014 |
| DE | 102013022107 A1 | 7/2015 |
| EP | 2423097 A1 | 2/2012 |
| EP | 2468620 B1 | 3/2017 |
| FR | 2669317 A1 | 5/1992 |
| FR | 2969574 A1 | 6/2012 |
| GB | 2252295 A | 8/1992 |
| GB | 2353515 A | 2/2001 |
| JP | H02300096 A | 12/1990 |
| JP | 2007210402 A | 8/2007 |
| JP | 2011163933 A | 8/2011 |
| RU | 2495784 C1 | 10/2013 |
| WO | 2010071842 A1 | 6/2010 |
| WO | 2015044898 A1 | 4/2015 |
| WO | 2015122764 A1 | 8/2015 |

OTHER PUBLICATIONS

Cowen, Steve et al., "Underwater Docking of Autonomous Undersea Vehicles Using Optical Terminal Guidance", OCEANS'97, MTS/IEEE Conference Proceedings, XP010246137, vol. 2, 1997, pp. 1143-1147.

Mischnick, David, "Aussetz-und Bergevorrichtung für das autonome Unterwasserfahrzeug PreToS", Doctoral Thesis, Technische Universität Berlin, Fakultat V—Verkehrs- und Maschinensysteme, Exam Date: Jun. 28, 2013, Issue Date: Nov. 28, 2013, pp. 1-153 and English Abstract 4 pp.

* cited by examiner

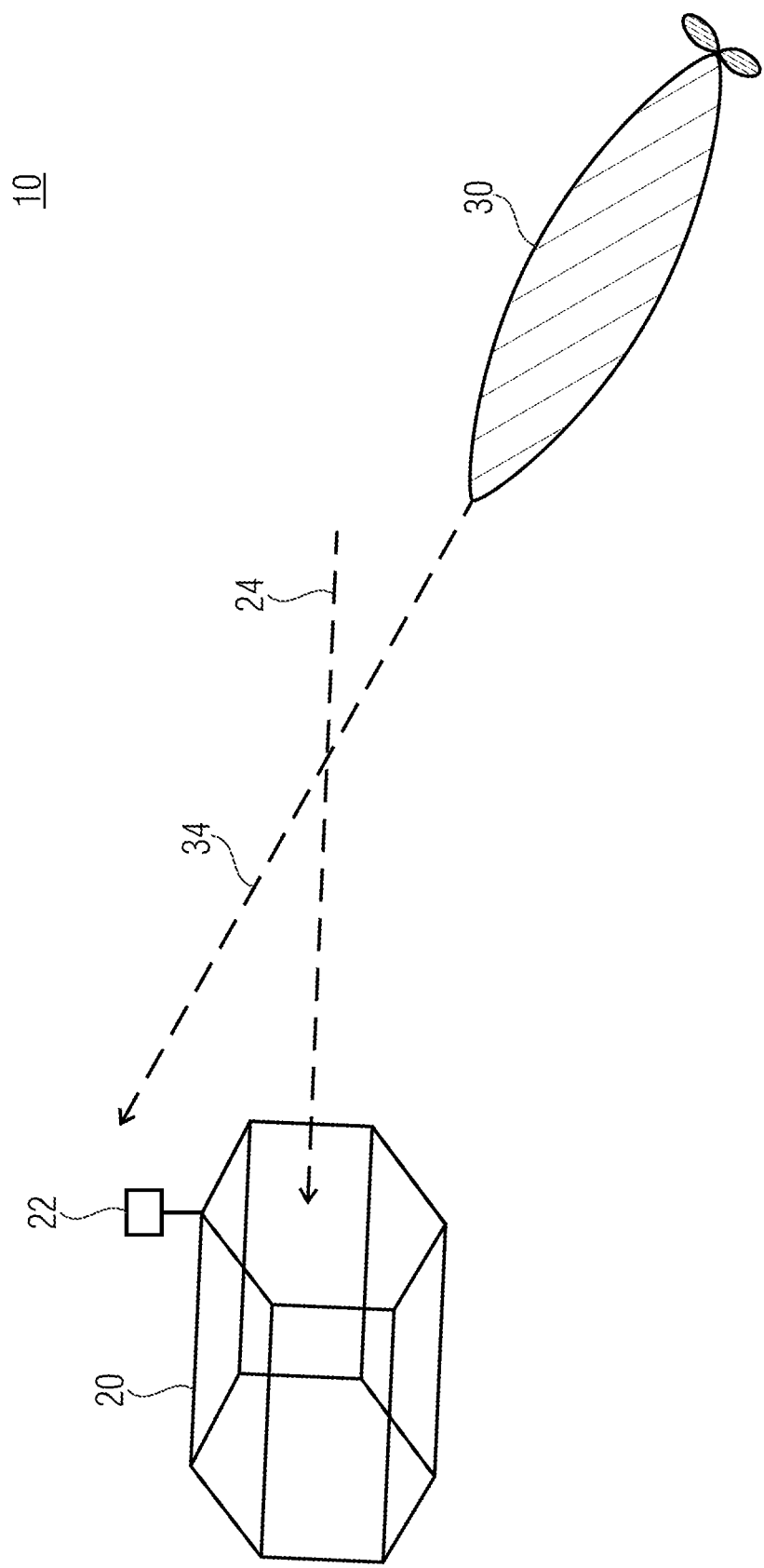

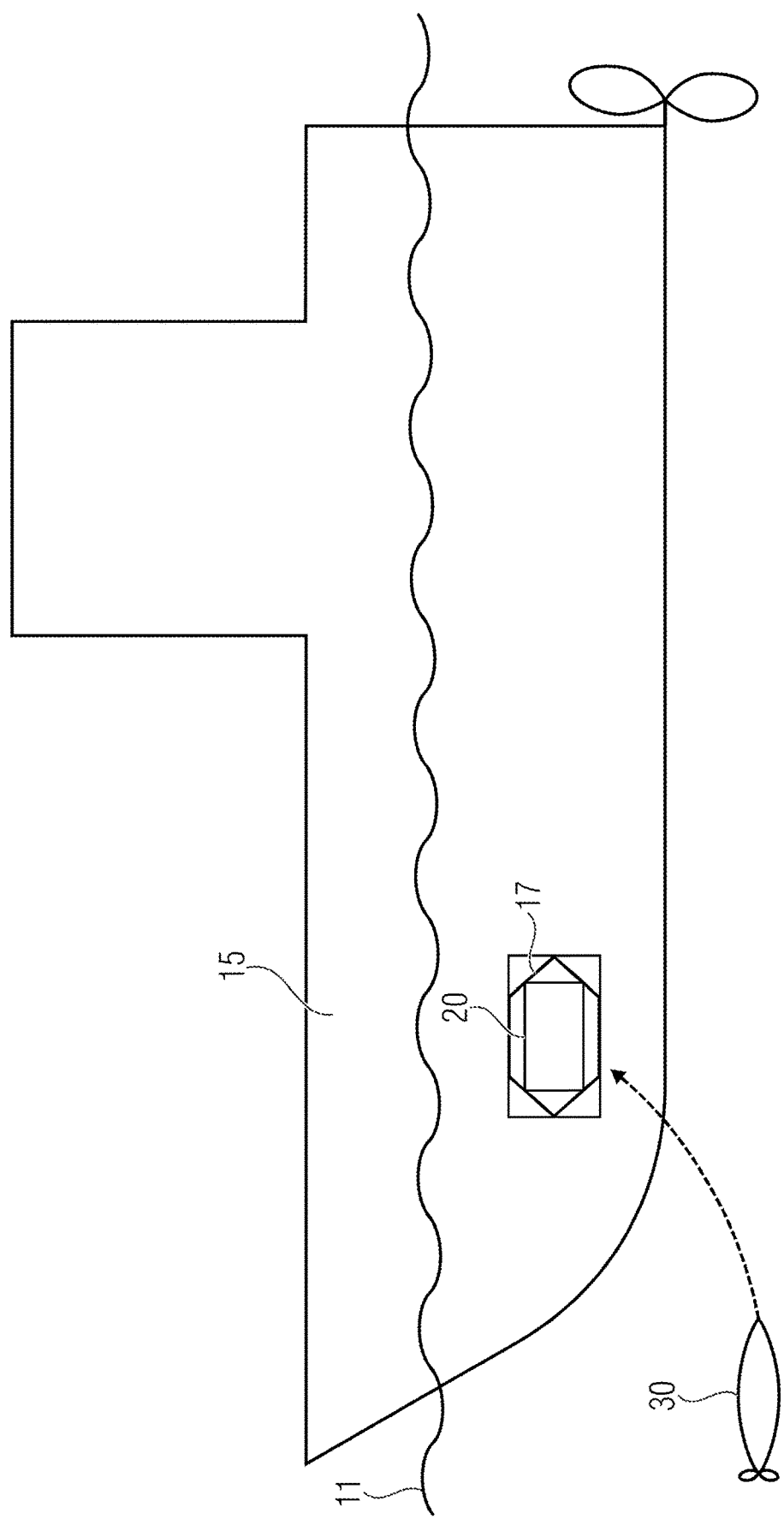

SYSTEM FOR NAVIGATION OF AN AUTONOMOUSLY NAVIGATING SUBMERSIBLE BODY DURING ENTRY INTO A DOCKING STATION, METHOD

CROSS-REFERENCE TO RELATED APPLICATIONS

This application is a continuation of copending International Application No. PCT/EP2017/057599, filed Mar. 30, 2017, which is incorporated herein by reference in its entirety, and additionally claims priority from European Application No. 16163313.6, filed Mar. 31, 2016, which is also incorporated herein by reference in its entirety.

Embodiments of the present invention relate to a system for navigation of an autonomously navigating submersible body when entering a docking station below the water surface as well as an associated method. Further embodiments relate to an apparatus for retrieving a driving autonomously navigating submersible body below the water surface.

BACKGROUND OF THE INVENTION

Many lowering and retrieving apparatuses for manned and unmanned submersible or diving vehicles use deck cranes operating via the lateral ship's side or tail of the mother ship. This process does not work satisfactorily when dealing with heavy and sensitive underwater equipment in rough water. Firstly, it is very likely that the underwater equipment swings during the lifting or lowering process, comes into contact with the ship and damages at the underwater equipment or mother ship result, also due to the different amplitudes and frequency responses of the two objects. There is a risk that the underwater equipment swings during hauling up and hits against the ship's side.

Additionally, when the vehicle is hauled up on board, the same approaches the air/sea interface until it does no longer swim, neither partly nor completely, but is partly or completely in air but can still be reached by successive high waves below the same. Such a situation has the effect that due to the lifting forces of the water, the hoist ropes are briefly relieved, either completely or partly, and then loaded again from the weight of the underwater equipment, depending on the course of the wave crest. This can also cause significant damages at the heavy but sensitive structure of both the underwater vehicle and the mother ship.

In the ideal case, retrieval works even when the mother ship makes rolling movements of up to 15° and the wave height is up to 5 meters. When the underwater vehicle (AUV=autonomous underwater vehicle or here simply called "fish") returns from the mission and in the meantime the weather condition has become very bad, the captain waits with the retrieval until swell and wind have calmed down. The costs for the ship are approximately 50 k € a day such that the need to wait has great economic disadvantages.

The approaches known so far solve the problem by lighter auxiliary structures that catch the fish at the water surface, fix the same and then connect the same together with the auxiliary structure to a crane or platform and then haul them both up on board together.

A further example is the retrieval system of the AUV Marlin by Lockheed Martin. A rope, at the end of which is an acoustic transponder, is lowered into the water from the mother ship. The AUV with folded out docking apparatus at the nose controls this transponder and flies over the same. Here, the rope running above the transponder is caught and connected, via a gripping mechanism, to a further rope mounted to an eye of the AUV. As soon as the crane rope is retrieved, a stopper attached to the rope gets caught in the eye. Thereby, power transfer to the AUV is realized. Subsequently, the AUV is lifted out of the water. A docking apparatus, towards which the AUV is pulled, is mounted to the crane.

The French Marine Institute IFREMER has patented a system including a cage lowered into the water. For retrieving a vehicle, the same throws out a rope with a buoy, which is retrieved by the ship by means of a further rope provided with a hook. The retrieved rope of the AUV is mounted to the cage and the station is lowered into the water. By the laterally attached floating bodies, the station swims on the water surface, the docking station itself is below the water. The AUV is pulled into the cage via the winch at the station, and fixed with the help of hydraulically operated locking mechanisms. Subsequently, the cage including the AUV is pulled through the station. Here, the cage orients itself along the longitudinal axis by a guiding rail. After the process, the AUV is within the docking station and is fixed with a further locking mechanism.

SUMMARY

According to an embodiment, a system for navigation of an autonomously navigating submersible body during entry into a docking station below the water surface may have: means for determining an actual motion vector of the autonomously navigating submersible body in relation to the set motion vector describing the optimum entry direction into the docking station, wherein the means for determining of the actual movement is mounted on the docking station; a calculating unit for determining the deviation between the actual motion vector and the set motion vector to determine control signals based on the deviation, wherein the calculating unit is disposed on the docking station; and a control determining the control signals based on the deviation and controlling the autonomously navigating submersible body during entry into a docking station by means of the control signals such that the actual motion vector approaches the set motion vector; wherein the autonomously navigating submersible body includes an autonomous driving mode and remote control driving mode and wherein the control is configured to activate the remote control driving mode in the near range of the docking station.

According to another embodiment, a method for navigation of an autonomously navigating submersible body during entry into a docking station below the water surface may have the steps of: determining an actual motion vector of the autonomously navigating submersible body in relation to the set motion vector describing the optimum entry direction into the docking station; determining the deviation between the actual motion vector and the set motion vector to determine control signals based on the deviation; and controlling the autonomously navigating submersible body based on the deviation and wherein controlling is performed such that the actual motion vector approaches the set motion vector.

Another embodiment may have a non-transitory digital storage medium having a computer program stored thereon to perform the method for navigation of an autonomously navigating submersible body during entry into a docking station below the water surface, the method having the steps of: determining an actual motion vector of the autonomously navigating submersible body in relation to the set motion vector describing the optimum entry direction into the docking station; determining the deviation between the actual motion vector and the set motion vector to determine control signals based on the deviation; and controlling the autonomously navigating submersible body based on the deviation and wherein controlling is performed such that the actual motion vector approaches the set motion vector when said computer program is run by a computer.

Embodiments of the present invention provide a system for navigation of an autonomously navigating submersible body (or AUV or fish) when entering a docking station below the water surface. In the basic configuration, the system includes means for determining an actual motion vector of the autonomously navigating submersible body in relation to the set motion vector describing the optimum entry direction into the docking station. One example for such a means is the underwater camera mounted, for example, on the docking station and monitoring the autonomously navigating submersible body over time or based on characteristic features, such as light signals, in such a way that its actual motion vector can be determined. Due to the fact that the underwater camera is mounted on the docking station, the actual motion vector is determined directly in relation to the set motion vector (when the camera angle in relation to the optimum entry direction is known). Further, the system includes a calculating unit either disposed also on the docking station or on the mother ship or also within the autonomously navigating submersible body. The calculating unit serves to determine the deviation between the actual motion vector and the set motion vector in order to determine control signals based on the deviation.

According to embodiments, the system can additionally include a control that determines, based on the determined deviation, the control signals and then directly controls the autonomously navigating submersible body during entry, such that the actual motion vector approaches the set motion vector or the same are aligned. Advantageously but not essentially, the control may be arranged within the docking station and can transmit, by means of a remote control connection, such as an acoustic modem or a light modem, the control signals to the autonomously navigating submersible body. Then, depending on these control signals, the autonomously navigating submersible body operates its control means (e.g., fins). As an alternative to the automated control of the AUV in the environment of the docking station, it would also be possible that the operator takes on the control and performs his control task based on the determined deviation between actual motion vector and set motion vector.

Embodiments of the present invention are based on the knowledge that it has been found out that retrieving autonomously navigating submersible bodies, AUVs, below the water surface can be performed significantly easier when the problem of exact determination of the motion direction of the autonomously navigating submersible body in relation to the catching station and thus improved control of the same is solved. Monitoring and localizing the autonomously navigating submersible body is performed with the help of sensors, such as one or several cameras or a sonar device attached to the docking station. Since the camera is mounted to the docking station, the relation between the perspective of the same and a so-called set motion vector describing the optimum entry direction for an autonomously navigating submersible body into the docking station is known. When monitoring the autonomously navigating submersible body, the actual motion direction and the actual motion vector of autonomously navigating submersible body can be determined, such that by the relation between the actual motion vector and the set motion vector, a deviation between the same can be determined in order to control the AUV based on this determined deviation. Here, in the near range of the docking station, the autonomous operation of the AUV is switched to the remote control mode, i.e., the AUV is controlled from the docking station, for example per (acoustic) modem. This approach enables secure and reliable retrieval of the AUV below the water. Retrieval below the water is advantageous since the drives of the AUV are frequently too weak to fight against the forces at the water surface, for example in rough weather. Providing the sensor technology, such as the camera, at the docking station is advantageous since the AUV has only very limited options for mounting the sensor technology, for space reasons or due to the low battery capacity.

According to embodiments, as already indicated, determining the actual motion vector can be simplified in that the AUV is provided with navigation lights based on which the orientation or longitudinal direction of the same can be detected. A further variation is the emission of a directed light beam that can be easily detected in water, originating from the AUV. The light beam can be emitted along the longitudinal axis and hence indicates the actual motion direction.

According to further embodiments, the docking station can also include an interface to the autonomously navigating submersible body via which the autonomously navigating submersible body can be charged or data exchanges performed. This is possible since the docking station, e.g., in the form of a cage, can be simply hauled along the boat together with the autonomously navigating submersible body without any damages of mother ship, docking station or autonomously navigating submersible body since both the docking station and the autonomously navigating submersible body are hauled along safely under the water surface.

As an alternative to the cage mounted to the mother ship as the docking station, the docking station can also be integrated into the mother ship which can be a conventional upper water boat or also a submarine. In this embodiment, the mother ship or the submarine has an under-water opening disposed below the water surface which the autonomously navigating submersible body enters. The control mechanism and in particular the detection of the actual motion direction compared to the set motion direction corresponds to the above embodiment.

A further embodiment relates to a respective method with the steps determining the actual motion direction in relation to the set motion direction and determining the deviation between the two motion vectors. According to further embodiments, the method can also include the step of controlling the autonomously navigating submersible body itself, wherein advantageously but not necessarily, control is performed automatically.

According to further embodiments, the system can be configured to very effectively slow down the autonomously navigating submersible body when entering the docking station. Here, it has been found to be advantageous to span an arresting rope that is mounted, for example with shock absorbers on the cage, within the cage, such that the autonomously navigating submersible body can be slowed down by this arresting rope. For this, the autonomously navigating submersible body can comprise, for example, a hook or can fold out a hook, such that good engagement results between the arresting rope and the autonomously navigating submersible body. Therefore, the control is configured to fold out the hook as soon as the autonomously navigating submersible body enters the cage in order to perform the braking action. Slowing down is needed because the autonomously navigating submersible body can only be controlled when a certain incident flow at the fins exists. For this, the autonomously navigating submersible body needs a minimum velocity of, for example 1 kn, even when entering the docking station.

Further embodiments relate to the fact that the autonomously navigating submersible body, when the same has missed the arresting rope, performs a so-called go-round action, i.e. leaves the cage at the rear and approaches the cage anew.

A further embodiment relates to a respective method for controlling this go-round action. Further embodiments relate to a computer program for performing the above-discussed methods.

BRIEF DESCRIPTION OF THE DRAWINGS

Embodiments of the present invention will be detailed subsequently referring to the appended drawings, in which:

FIG. 1a is a schematic illustration of a system including a docking station and an autonomously navigating submersible body during entry according to embodiments;

FIG. 4 is a schematic illustration of a possible arrangement of the docking station in relation to the mother ship.

DETAILED DESCRIPTION OF THE INVENTION

Figure 1B:
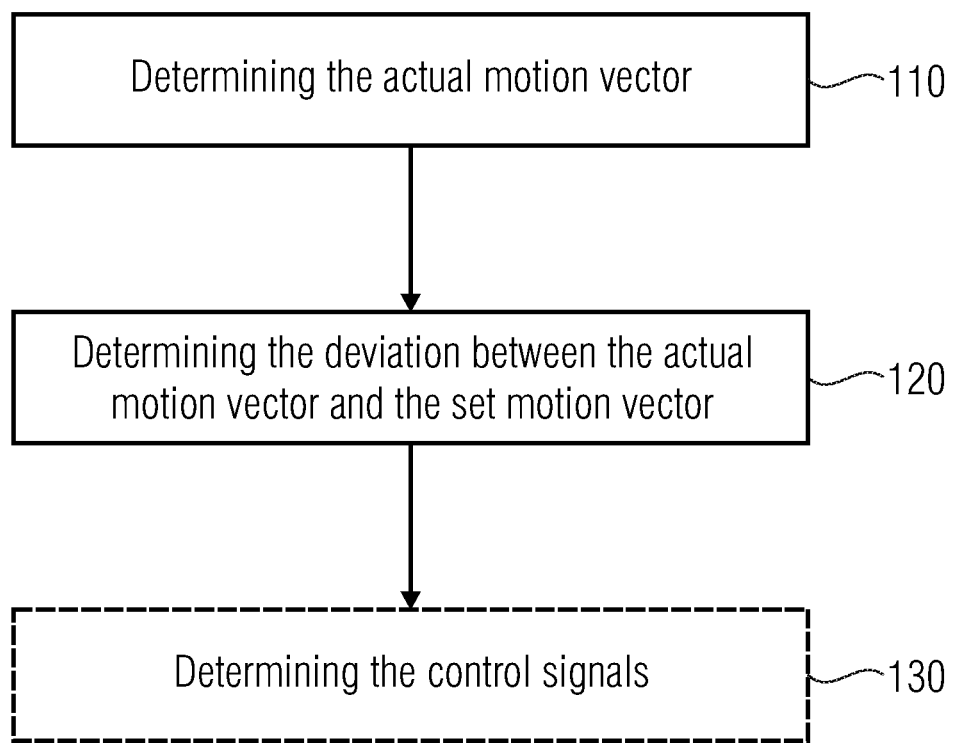
FIG. 1b is a schematic flow diagram of a navigation process when the autonomously navigating submersible body enters the docking station according to embodiments.

Before embodiments of the present invention will be discussed below based on the figures, it should be noted that equal elements and structures are provided with the same reference numbers such that the description of the same is interapplicable or exchangeable.

FIG. 1a shows a system 10 with a docking station 20 and an autonomously navigating submersible body 30.

In this embodiment, the docking station 20 is configured, for example as tube-shaped or honeycomb-shaped structure and serves to capture and retrieve the autonomously navigating submersible body 30 as well as to protect the same from waves and flotsam and also the collision of the autonomously navigating submersible body 30 with the ship's side of the mother ship (not shown). Typically, the catching station 20 is at least as long as the autonomously navigating submersible body 30. At the beginning of the retrieving action, the autonomously navigating submersible body 30 is below the spume and wave zone in a range where the water is comparatively quiet.

The autonomously navigating submersible body 30, advantageously an autonomously driving vehicle (AUV), has drive and control means, such as steering gear, as well as normally individual navigation means and individual control logic (algorithms). The autonomously navigating submersible 30 can navigate dynamically, i.e. via fins that only operate when the autonomously navigating submersible body 30 is driving. Either the drive itself or the ride through the water causes flow against the steering gear, such that the same can operate. Alternatively, it would also be possible that pod propulsion systems, i.e. pivoting propellers are provided. Control of the autonomously navigating submersible body can be performed autonomously, semi-autonomously or by means of a remote control connection, wherein, in the case of submarine usage, the remote control connection is typically realized by a remote control connection based on an acoustic modem or a light modem (for emitting a modulated light beam).

Since the docking station 20 is normally lowered from the mother ship, the position and in particular the orientation in three-dimensional space are variable. This is a difficult task for the autonomously navigating submersible body, since the autonomously navigating submersible body cannot determine by itself how it can enter the docking station 20. Thus, there is the need for a navigation aid improving the entry of the autonomously navigating submersible body 30 into the docking station.

For this, in this embodiment, the docking station 20 comprises sensors, such as cameras, sonars or other sensors 22 that monitor the autonomously navigating submersible body. These sensors 22 are fixed to the docking station 20 such that the perspective, for example of the camera 22, has a very clear relation to the optimum entry direction 24 into the docking station 20. The optimum entry direction which is also referred to as set motion vector is illustrated by means of the arrow. In this embodiment, where the docking station 22 represents a honeycomb-shaped cage structure, the optimum entry direction 24 is centered and perpendicular to the opening of the honeycomb.

The camera 22 monitors the autonomously navigating submersible body 30 and here in particular the ride of the autonomously navigating submersible body 30 through the water. Starting from the ride, an actual motion direction or an actual motion detector 34 of the autonomously navigating submersible body 30 can be determined. This determination is made dynamically, i.e. based on the direction of motion or motion direction of the autonomously navigating submersible body or the movement over time. Alternatively, it would also be possible that characteristics, such as the longitudinal axis of the autonomously navigating submersible body 30, are detected, in dependence on which the motion vector can be determined.

Since now both the actual motion vector 34 and the set motion vector 24 are known, the correction requirements with respect to the movement of the autonomously navigating submersible body 30 can be inferred by determining the deviation between the two vectors. Starting therefrom, optionally, control signals can be determined by which the autonomously navigating submersible body 30 is controlled.

This method is shown in FIG. 1b. FIG. 1b shows the method 100 with the steps 110 of determining the actual motion vector 34 and determining 120 the deviation between the actual motion vector 34 and the set motion vector 24. Further, the method includes the optional step 130 of determining the control signals for controlling the autonomously navigating submersible body 30. These control signals are transmitted, for example, starting from the cage 20 to the autonomously navigating submersible body 30 with the help of an acoustic modem or a modulated light beam, such that the autonomously navigating submersible body 30 actively enters the honeycomb structure and, at first, that its motion path approaches the set motion path 24 or reaches the same, respectively.

Here, it should be noted that the control electronics for controlling the autonomously navigating submersible body 30 is mounted on the docking station 20, which takes over the calculation and navigation of the autonomously navigating submersible body 30, at least in the environment around the docking station 20. This means that the autonomously navigating submersible body 30 has an autonomous driving mode (where it steers itself) and a remote control driving mode (where the same is controlled externally, i.e. from the control at the docking station 20). The remote control driving mode is activated in the near range of the docking station 20 (i.e. when entering or just before entering the docking station 20 e.g. within 0-10 m or within up to 25 m or up to 50 m). For this, the control can transmit a respective control signal. In other words, just before entering the docking station, switching from autonomous navigation to remote control navigation takes place and monitoring is performed via cameras or sensors, e.g. at the docking station.

Figure 2:
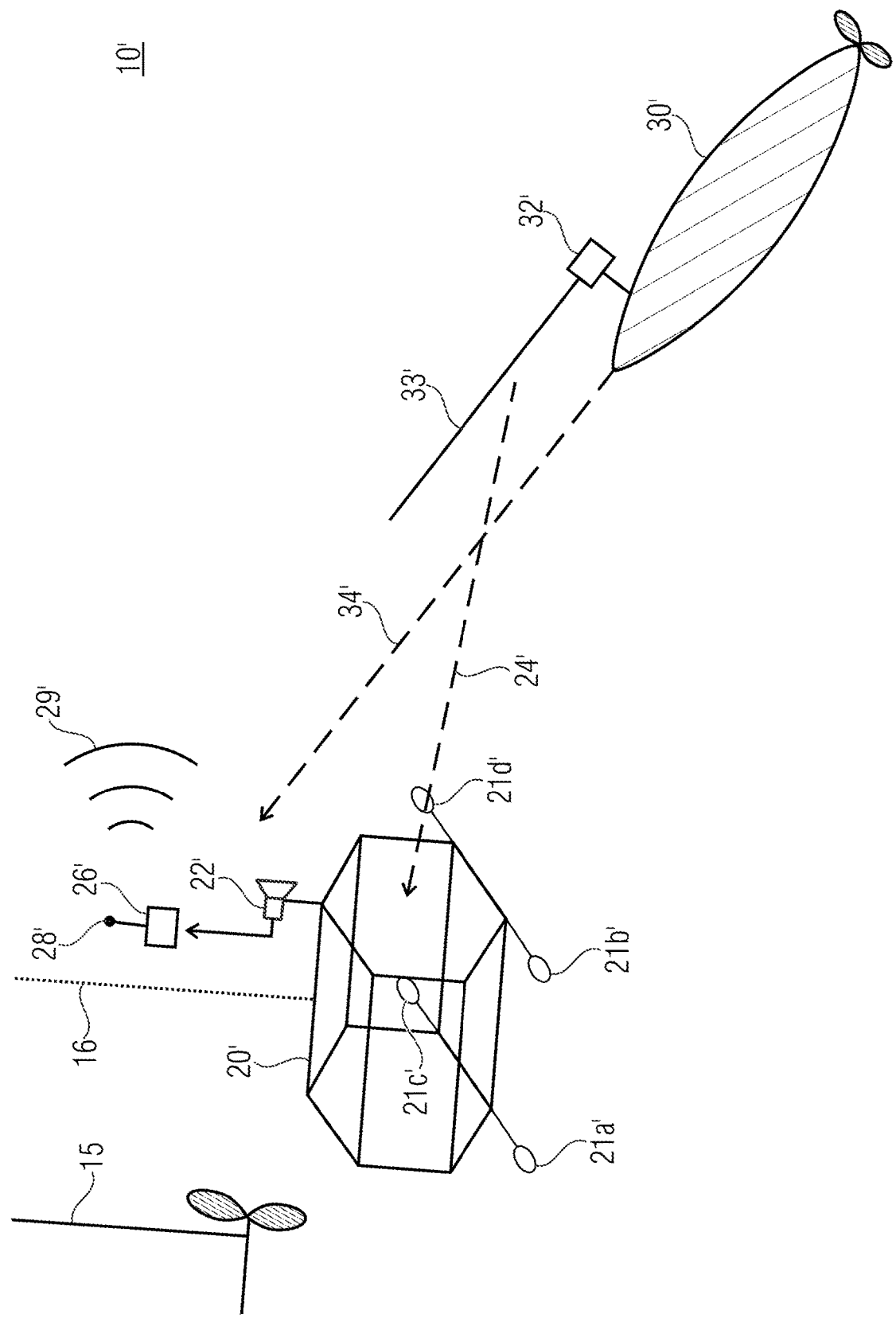
FIG. 2 is a schematic illustration of an extended system of autonomously navigating submersible body and docking station.

With reference to FIG. 2, a further embodiment is explained which is configured to be more complex compared to the system 10. FIG. 2 shows a system 10' with a docking station 20' and needed electronics for determining the actual movement of the autonomously navigating submersible body 30' and the control of the same. This electronics mainly includes the camera 22', the calculating unit 26' and the communication modem 28' and acoustic modem, respectively.

The docking station 20' can be coupled to the mother ship 15, for example by means of a rope 16. The rope 16 is flexible, such that there might be a need for stabilizing the docking station 20 in space. The same is ideally oriented in three dimensions or angles of space and stabilized, for example via inertial sensors (not illustrated) comparable to a Segway. The actuator technology of the docking station 20' can be realized, for example, by propellers and turbines 21a'-21d'. In addition or as an alternative to the propellers 21a'-21d', stabilization can also take place by means of ropes operated by winches. Due to the fact that the ropes are tightened or released in dependence on the sea condition, sea condition compensation can be realized. Via the rope, the docking station 20' can be hauled (retrieved) separately or together with the autonomously navigating submersible body 30', e.g. by means of a crane. Here, it should also be noted that fixed mounting of the docking station 20' to the mother ship 15 by means of rods would be possible.

The autonomously navigating submersible body 30' can be compared to the autonomously navigating submersible body 30, however, the same additionally includes a focused light source 32' emitting a light signal 33' along the longitudinal direction of the autonomously navigating submersible body 30. This light signal can be emitted, for example, from the nose or a different position at the autonomously navigating submersible body 30. Advantageously, the light source 32' is a focused light source, such as a green or blue laser since the same have a relatively high range in water. It is advantageous that the focused light source points towards the front and in that way makes visible where the AUV 30' is at the moment and in what direction 34' the same drives. As an alternative to a directed light source, several navigation lights can be provided, for example along the longitudinal axis of the autonomously navigating submersible body 30' based on which also the orientation of the autonomously navigating submersible body can be determined.

The camera 22' detects the light signal 33' that runs parallel to the actual motion direction 34' and in that way determines the actual motion vector 34'. The camera 22', here having a perspective parallel to the set motion vector 24', can output this determined individual frame or frame set over time to the calculating unit 26' which then determines the deviation between vectors 24' and 34'. Further, the calculating unit 26' also determines the control signals needed for correcting the course of the autonomously navigating submersible body 30'. Via the modem 28', these control signals are then transmitted to the autonomously navigating submersible body 30', e.g. as acoustic signals 29', which then corrects its course accordingly based thereon.

Here, it should be noted that it would also be possible, according to further embodiments, that the docking station 20' has such a focused light source 32' and the sensor technology, such as the camera 22', is disposed in the AUV together with the control 26'. Here, the principle is the same, wherein the AUV 30' knows the actual motion vector and only relates the same to the determined set motion vector.

According to further embodiments, it would also be possible that the docking station 20' comprises an additional spotlight illuminating the environment such that the identification of the submersible body 30' is improved.

With reference to the docking station 20', for protecting the autonomously navigating submersible body 30' upon entry, it should be noted that, according to embodiments, the cage can be padded with foams or elastic material, such as air-filled tubes that provide protection from hard collisions and protect both the cage but in particular the autonomously navigating submersible body 30' from damages.

By the concept suggested herein, the further boundary conditions of AUVs can also be satisfied. These are that the AUV has, due to the limited battery capacity, only little energy for navigation and control, in particular at the end of the mission. By transferring components to the docking station, the concept avoids, on the one hand, energy consumption and energy consumers on board and, on the other hand, also the "occupation" of installation space of the AUV.

Figure 3:
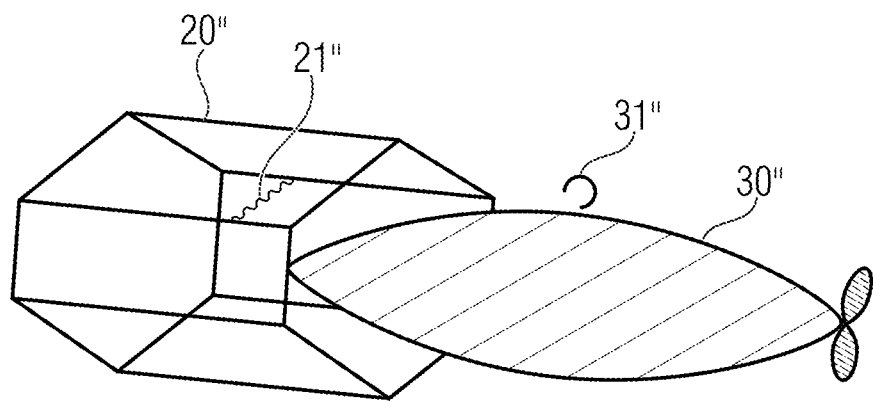
FIG. 3 is a schematic illustration of autonomously navigating submersible body and docking station for illustrating the slowing-down action.

With reference to FIG. 3, a further aspect during entry of an autonomously navigating submersible body 30" comparable to an autonomously navigating submersible body 30 and 30' into the docking station 20" will be discussed. Like the previous docking stations 20 and 20', the docking station 20" is configured as a honeycomb-shaped cage wherein the honeycomb-shaped cage 20" is open both to the front and to the rear. The honeycomb-shaped cage 20" comprises an arresting rope 21" that is loosely spanned in the interior. The arresting rope 21" is configured to engage the autonomously navigating submersible body 30' during entry of the autonomously navigating submersible body 30" into the cage 20" and to thereby slow down the autonomously navigating submersible body 30". This need exists since the autonomously navigating submersible body 30" normally needs a certain basic or minimum velocity to be effectively controlled and also since the space in the cage 20" is limited.

The arresting rope 21" is, for example, an elastic rope or mounted via viscoelastic shock absorbers. According to embodiments, a hook 31" gripping the arresting rope 21" can be provided at the autonomously navigating submersible body 30".

According to embodiments, the hook 21" is actively folded out as soon as the autonomously navigating submersible body 30" enters the docking station 20". For that, the arresting rope 20" can emit the respective control signals to the autonomously navigating submersible body 30" by its electronics (not illustrated). At the same time, the propellers or nozzles of the submersible body 30" are turned off. Also, according to a further embodiment, additional locking can be triggered, for example at the docking station 20" itself.

According to a further embodiment, for the case that the hook 31" does not hook into the arresting rope 21", it is also possible that a so-called go-round process is triggered. Thus, it is advantageous that the cage 20" is open both to the front and to the rear, such that the autonomously navigating submersible body 30" can exit again at the back and makes an about-turn to enter the cage a second time. The control for the autonomously navigating submersible body 30" can repeat this process until the vehicle is firmly caught in the cage.

According to a further embodiment, one of the above-discussed docking stations 20, 20' and 20" can also include interfaces, e.g. electric interfaces for maintenance of the autonomously navigating submersible body 30, 30' or 30". These interfaces serve, for example, to charge the battery of the autonomously navigating submersible body 30', to transfer the measured data or to load up the next mission. Thereby, it is possible to perform the maintenance procedures needed without having to haul the docking station 20, 20' and 20" up on board together with the submersible object 30, 30' and 30". The docking station 20, 20' and 20" together with the respective autonomously navigating submersible body 30, 30' or 30" only has to be retrieved on board when repairs are needed or when the submersible object 30, 30', 30" is to be stowed away.

With reference to FIG. 4, a further embodiment is shown. Since the above-discussed navigation aid or navigation method steps are configured to catch an autonomously navigating submersible body below the water surface, it is also possible that the mother ship 15 comprises an opening or an opening 17 that can be opened by a flap 17 below the water line 11, such that by means of the above-described principles of navigation, the autonomously navigating submersible body 30' can be navigated directly into the mother ship 15. Seen from another perspective, this means that the docking station 20 is arranged inside the ship body of the mother ship 15 and can be opened by means of the opening 17. Such a concept is not only possible for mother ships 15 operating at the water surface 11 but also for under-water vehicles or submarines (not illustrated).

All above-discussed optional embodiments, in particular the docking apparatus, can be combined with the concept suggested herein.

Since lowering and retrieving also takes place below the water surface, in this concept, mutual damages are unlikely due to the quiet environment below the water surface 11. Here, the sensor technology and the control can also be transferred to the docking station 20 and the mother ship 15, respectively, which then brings about the essential advantages that the energy-intensive apparatuses like illumination and cameras are supplied from the mother ship by which also the AUV is controlled during the retrieval process.

Here, it should be noted that even when it is assumed in the above embodiments that the AUV is remote-controlled, this remote control process relates to the entry into the docking station while the AUV, apart from that, normally operates autonomously.

According to further embodiments, the above control signals can also be used to rotate the docking station in the water (under the assumption that the means for orientation 21a'-21d' are provided at the docking station) in order to align actual and set vector with one another.

Here, it should be noted that the sensor technology is not limited to cameras but that alternatively other sensors, such as sonar sensors, can be used. Here, it is advantageous when sonar reflectors that reflect the sonar signal (in a directed manner) are disposed at the AUV, such that imaging sonar sensors can localize the AUV.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A system for navigation of an autonomously navigating submersible body during entry into a docking station below water surface, comprising:
   a determiner for determining an actual motion vector of the autonomously navigating submersible body in relation to a set motion vector describing an optimum entry direction into the docking station, wherein the determiner for determining the actual motion vector is mounted on the docking station;
   a calculating unit for determining the deviation between the actual motion vector and the set motion vector to determine control signals based on a deviation, wherein the calculating unit is disposed on the docking station; and
   a control determining the control signals based on the deviation and controlling the autonomously navigating submersible body during entry into the docking station by means of the control signals such that the actual motion vector approaches the set motion vector;
   wherein the autonomously navigating submersible body comprises an autonomous driving mode and remote control driving mode and wherein the control is configured to activate the remote control driving mode in a near range of the docking station.

2. The system according to claim 1, wherein the control comprises an acoustic modem for emitting an acoustic data signal and/or a light modem for outputting a modulated light beam and
   wherein the acoustic modem or the light modem is configured to establish a communication connection between the docking station and the autonomously navigating submersible body for exchanging the control signals.

3. The system according to claim 2, wherein the calculating unit is disposed on the docking station and configured to transmit the control signals by means of the acoustic modem or the light modem to the autonomously navigating submersible body to be controlled.

4. The system according to claim 1, wherein the determiner comprises at least one camera.

5. The system according to claim 4, wherein the autonomously navigating submersible body comprises one or several navigation lights and/or a light source for emitting a focused light beam; and wherein the camera is configured to determine the actual motion vector based on the optically detected navigation lights and/or based on the focused light beam.

6. The system according to claim 5, wherein the light source comprises a green or blue laser emitting the focused light beam along the longitudinal axis of the autonomously navigating submersible body.

7. The system according to claim 1, wherein the determiner comprises an active or passive sonar.

8. The system according to claim 1, wherein the docking station is a cage that is firmly connected to a mother ship or connected to the mother ship by means of ropes.

9. The system according to claim 8, wherein the docking station comprises an interface to the autonomously navigating submersible body by means of which the autonomously navigating submersible body can be supplied with electric energy.

10. The system according to claim 1, wherein the docking station is disposed in an underwater opening of a mother ship or a submarine.

11. The system according to claim 1, wherein the autonomously navigating submersible body comprises a further camera that is configured to optically detect the docking station and to thereby determine its actual motion vector in relation to the set motion vector.

12. The system according to claim 1, wherein the control unit is configured to effect slowing-down of the autonomously navigating submersible body during entry into the docking station.

13. The system according to claim 12, wherein slowing down is performed by catching an arresting rope of the docking station.

14. The system according to claim 13, wherein the control is configured to fold out a hook of the autonomously navigating submersible body to catch the arresting rope by means of the hook as soon as the autonomously navigating submersible body enters the docking station.

15. The system according to claim 13, wherein the control is configured to repeat an entry maneuver when the hook has missed the arresting rope.

16. The system according to claim 1, wherein the docking station comprises a unit for orienting the docking station in water.

17. A method for navigation of an autonomously navigating submersible body during entry into a docking station below water surface, comprising:
   determining an actual motion vector of the autonomously navigating submersible body in relation to a set motion vector describing an optimum entry direction into the docking station from the point of view of the docking station;
   determining a deviation between the actual motion vector and the set motion vector to determine control signals based on the deviation; and
   controlling the autonomously navigating submersible body based on the deviation and wherein controlling is performed such that the actual motion vector approaches the set motion vector by use of a remote control driving mode;
   wherein the autonomously navigating submersible body comprises an autonomous driving mode and remote control driving mode and wherein the remote control driving mode is activated in a near range of the docking station.

18. The method according to claim 17, wherein the method further comprises folding out a hook during entry into the docking station and catching an arresting rope of the docking station with the hook for slowing down; and wherein the entry maneuver is repeated when the hook has missed the arresting rope.

19. A non-transitory digital storage medium having a computer program stored thereon to perform a method for navigation of an autonomously navigating submersible body during entry into a docking station below a water surface, the method comprising:

determining an actual motion vector of the autonomously navigating submersible body in relation to a set motion vector describing an optimum entry direction into the docking station;

determining a deviation between the actual motion vector and the set motion vector to determine control signals based on the deviation; and controlling the autonomously navigating submersible body based on the deviation and wherein controlling is performed such that the actual motion vector approaches the set motion vector by use of a remote control driving mode;

wherein the autonomously navigating submersible body comprises an autonomous driving mode and remote control driving mode and wherein the remote control driving mode is activated in a near range of the docking station, when said computer program is run by a computer.

* * * * *